A. H. J. MILLER.
GAGE.
APPLICATION FILED JUNE 17, 1914.
1,129,707.
Patented Feb. 23, 1915.
2 SHEETS—SHEET 1.
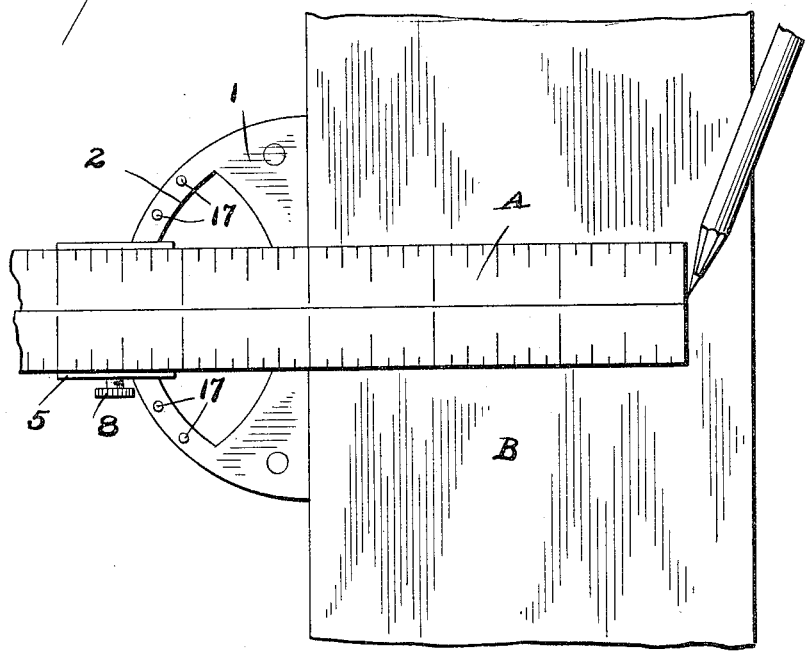
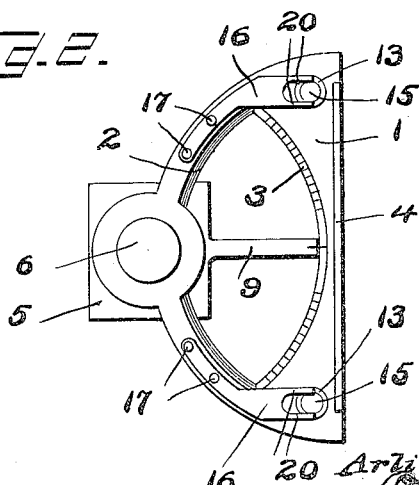

A. H. J. MILLER.
GAGE.
APPLICATION FILED JUNE 17, 1914.
1,129,707.
Patented Feb. 23, 1915.
2 SHEETS—SHEET 2.
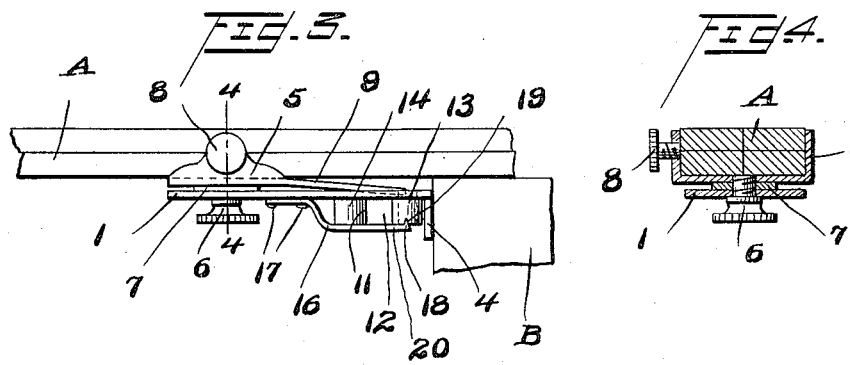
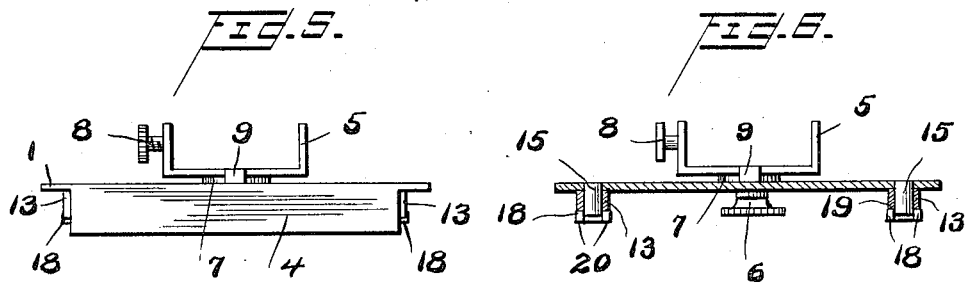
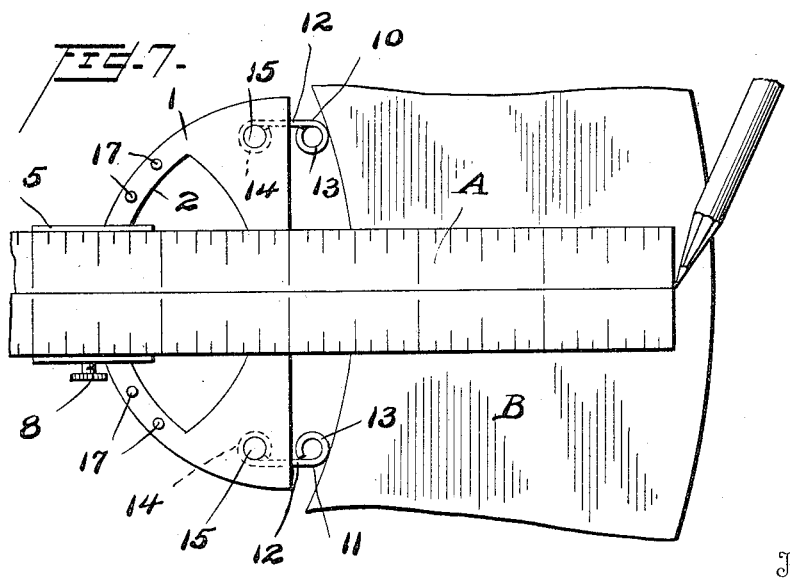
Witnesses
Harold Strauss
Chas. J. Chunn
Inventor
Arlington H. J. Miller
By
Attorney

UNITED STATES PATENT OFFICE.

ARLINGTON H. J. MILLER, OF EASTON, PENNSYLVANIA.

GAGE.

1,129,707.     Specification of Letters Patent.     Patented Feb. 23, 1915.

Application filed June 17, 1914.   Serial No. 845,715.

*To all whom it may concern:*

Be it known that I, ARLINGTON H. J. MILLER, a citizen of the United States, residing at Easton, in the county of Northampton and State of Pennsylvania, have invented certain new and useful Improvements in Gages; and I do hereby declare the following to be a full, clear, and exact description of the invention, such as will enable others skilled in the art to which it appertains to make and use the same.

My invention relates to improvements in gages and has for its primary object to provide a simple, inexpensive and effective device that is to be attached to the ordinary rule and is so arranged as to be applicable to straight, curved or otherwise uneven edges.

Another object is to provide a device of the character described that may be readily and easily attached to a folding pocket rule and may be operated as a tri-square bevel and gage for use in connection with various kinds of work and which is inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a top plan view of my improved gage showing it attached to a ruler and applied to a straight edged board, also a pencil in position that it would be placed to rule a line parallel to the straight edge of the board, Fig. 2 is a bottom plan view of the gage detached from the ruler, Fig. 3 is a side elevation showing the gage attached to a ruler and applied to a straight edged object or board, Fig. 4 is a transverse sectional view taken on line 4—4 of Fig. 3, Fig. 5 is a front elevation of the device detached, Fig. 6 is a transverse sectional view taken through the gage adjacent to the forward end thereof, and Fig. 7 is a top plan view showing the device attached to a rule and applied to a curved edge of a board.

Referring to the drawings by characters of reference, A designates as an entirety a folding pocket ruler of the ordinary construction and 1 a semi-circular body portion of my improved gage. The body portion 1 is formed of any suitable thin metal and is provided with an opening 2 therein so that the rule A to which the device is attached as will be later more fully described may be seen from both sides of the body. The opening 2 provides opposed curved edges which may have graduations 3 formed thereon and are preferably beveled. Formed on the straight edge of the body portion 1 is a depending flange 4 that is spaced at its ends from the ends of the straight edge of the body portion, and designed to engage the straight face or edge of the board or object B, to be gaged or marked upon. Adjacent to the rear or curved edge of the body 1 and upon the upper face thereof is pivotally secured an angular bracket or clip 5 that is approximately U-shape in cross section and provided centrally of its bottom with a screw threaded opening to receive a screw 6 which is inserted through the body plate 1 and serves to adjustably or pivotally secure the bracket or clip 5 to the body. A washer 7 is interposed between the body and bottom face of the clip 5 so that free adjustment relative to the body is provided. The screw 6 is preferably provided with an enlarged knurled head so that it may be readily turned to provide the desired adjustment of the body. By tightening the screw the body 1 may be secured or held in adjusted position relative to the clip or ruler. In one side wall of the clip 5 is a set screw 8 that is designed to engage the ruler A to hold it to the clip in adjusted position. The clip 5 is of such size as to receive the ordinary type of pocket rule and to be adjustable thereon as shown clearly in Fig. 4 in the drawings. Formed integral with and extending forwardly from the bottom wall of the clip 5 is a relatively straight finger 9 that extends across the opening 2 in the body 1 and terminates adjacent to the straight edge thereof so that it may coöperate with the graduated edge of the opening, thus insuring a reliable gaging action.

As a means to adapt the device for use in connection with curved or otherwise uneven edges, I provide rounded end work engaging members 10 and 11 that are pivoted to the body adjacent to the ends of the straight edge thereof. Each of these members is identical as to construction and only one of them need be described, in this instance the one designated 11 being chosen. The work engaging member 11 consists of a rectangular strip of suitable sheet metal 12 and bent at its ends to provide circular loops 13 and 14. The loop 14 is mounted upon a pivot pin 15 carried by the body 1 at a point adjacent one end of the straight edge thereof so that the loop 13 may be swung to extend outwardly at right angles to the straight edge of the body and into position where it may be applied to curved or rounded edge material. Carried on each end of the body adjacent to the members 10 and 11 is a spring arm 16 that is secured by suitable fastening means 17 to the body 1 and is offset for a distance equivalent to approximately two-thirds its length so as to be spaced and parallel to the body and extends toward the straight edge thereof. The free end of the spring arm is provided with projections 18 that are designed to engage within notches 19 formed in opposite sides of the pivoted loop 13. It will thus be seen that the member 11 may be locked in extended or out of the way position through the medium of the notches 19 and projections 18 fitting therein. The arms 16 also serve to hold the member 11 against derangement relative to the pivot 15.

Assuming that the device is attached to the rule A as described and is to be applied to a straight edge board or object B, the straight edge of the body with the flange 4 thereon is placed against the straight edge of the board B, and should a line have to be drawn parallel to the straight edge a certain distance therefrom, by loosening the set screw 8 and adjusting the rule A the proper gaging may be had. The pencil is placed at the end of the rule and the rule with the gage thereon is slid while the pencil is held against the end of the rule causing a mark to be made.

To use the device in connection with a rounded edge board or curved surface, the members 10 and 11 are swung so that the loops 14 are in position to engage the board or object in advance of the straight edge of the body. To effect the adjustment described the arms 16 are moved so that projections 18 are disengaged from the notches 19 thus allowing the members 10 and 11 to be swung on the pivot 15. After the members 10 and 11 are in the desired position as illustrated in Fig. 7 the projections 18 are positioned within the notches 19 and the work engaging members are locked in the desired position. The loops 14 are rounded and when applied to a curved edge as shown in Fig. 7 the marking of a line concentric with the curved edge in a manner similar to that described in connection with the application of the device to a straight edge board. It will be readily seen the flange 4 in being spaced from the side edges of the body permits the disposal of the members 10 and 11 in the desired position to adapt the device for application to curved face or edge work. The arms 16 are bifurcated at their free ends to provide spaced arms 20 and it is on the ends of the arms 20 that the projections 18 are formed. The arms 20 are arranged to engage the notched sides of the pivot loops 13.

It will be readily seen that various adjustments are permitted with my improved gage so that it is adapted for different characters of work, the adjustment of the device being easily permitted.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What is claimed is:—

1. In combination with a ruler, a gage to be attached to the ruler consisting of a semicircular body portion, a bracket to receive the ruler, means to pivotally and detachably connect the body portion to the bracket, means to secure the bracket to the ruler in adjustable position and work engaging members pivoted adjacent to each end of the body, said members having rounded work engaging ends.

2. In a device of the character described, the combination with a ruler, a gage to be attached thereto consisting of a semi-circular body plate, means to detachably and pivotally connect the plate with the ruler, said means being adjustable longitudinally of the ruler, pivoted work engaging members carried on the body plate and having rounded ends, and means to lock said work engaging members in adjusted position carried by the body plate.

3. In a device of the character described, the combination with a ruler, of a gage to be attached thereto consisting of a semi-circular body plate, means to detachably and pivotally connect the plate with the ruler, said means being adjustable longitudinally of the ruler, pivoted work engaging members carried on the ends of the body plate, means to lock said work engaging members in extended or out of the way position carried by the body plate consisting of spring arms, said work engaging members being provided with notches at their pivoted ends and projections on the spring arms to engage within the notches.

In testimony whereof I affix my signature in presence of two witnesses.

ARLINGTON H. J. MILLER.

Witnesses:
FLORENCE BARBEREY,
HELEN M. ACKERMAN.